FIG. 1

INVENTORS
P. W. CLARKE
J. A. PIRRAGLIA
R. RANDO

BY R. B. Ardis
ATTORNEY

April 19, 1966  P. W. CLARKE ET AL  3,247,444
FREQUENCY CONVERTER
Filed Dec. 19, 1962  6 Sheets-Sheet 4

United States Patent Office 3,247,444
Patented Apr. 19, 1966

3,247,444
FREQUENCY CONVERTER
Patrick W. Clarke, Murray Hill, N.J., and Joseph A. Pirraglia, New York, and Robert Rando, Brooklyn, N.Y., assignors to Bell Telephone Laboratories, Incorporated, New York, N.Y., a corporation of New York
Filed Dec. 19, 1962, Ser. No. 245,803
23 Claims. (Cl. 321—4)

This invention relates to frequency conversion systems and more particularly to solid state feedback controlled frequency conversion systems.

Where it has been necessary to obtain a source of low frequency both in the event of a commercial power failure or where commercial power is not available, gas turbine or diesel driven alternators have been employed. Diesel driven alternators were preferred to gas turbine driven alternators for applications where frequency stability was an important consideration because of their ability to operate at speeds which may be mechanically governed to control output frequency. The physical size of a diesel engine is, however, many times larger than that of a gas turbine, hence they are less desirable for applications where space is at a premium. New problems arise with the smaller gas turbines in that they operate at speeds too high for directly coupling the shaft to a low frequency alternator. Customary solutions to the gas turbine coupling problem involve either reduction gears or hydraulic speed reduction devices, the outputs of which are then coupled to the low frequency alternator. Both arrangements are cumbersome and expensive. The gear reduction method also requires governing the turbine speed which is a serious disadvantage since optimum efficiency of the turbine system requires that the speed of the turbine be permitted to vary with the load. A constant frequency output can, therefore, only be obtained by sacrificing efficiency.

Regardless of the mechanical systems employed, the frequency output of both the diesel and gas turbine systems is still relatively variable. The speeds, hence the high frequency output of the diesel and gas turbine systems, are also limited by the mechanical parameters. One can easily imagine the tremendous cost, space and maintenance problems involved in such systems when the physical sizes of the filtering components, the alternators, the driving diesel or gas turbine, and associated coupling equipment are considered.

Other approaches to the problem have involved the use of thyratron and similar electronic circuitry. Such schemes have been found to have disadvantages such as poor output wave form and regulation, complexity, unreliability, excessive filtering, necessity of utilizing some of the output power as a power source for the conversion components, and the like. The disadvantages of these systems are attested to by the fact that mechanical systems are still being employed for most new applications.

A major problem which has plagued both the mechanical and electronic systems has been the current and voltage phase shift inherently involved when inductive or non-linear loads are supplied. Since the output current and voltage are of a different polarity for a portion of each cycle (hence their "zero crossings" are different), the response of the control circuitry involved was inherently and necessarily slow. This, in turn, limited the frequencies involved, caused the output voltage to vary, and indirectly led to considerable harmonic distortion of the fundamental frequency wave form.

The electronic, and to some extent the mechanical, systems when called upon to deliver relatively large amounts of power have also had the additional problem of the isolation transformer. These transformers are necessary in rectifier-conversion units to provide for isolation between the commercial input power supply (usually supplied by cables from a generating station located many miles away) and the output circuit and vice versa. The isolation introduced by the transformers protects the circuits from transient surges such as those caused by lightning and intercircuit induction but have power factor disadvantages (the kva. consumption is many times in excess of the kw. or usable power consumption) which often prompts the commercial supplier to require the consumer to provide compensating networks. The compensating networks, as well as the filtering networks associated with the isolation transformer, because of the relatively low frequency and high power ratings involved are also of a relatively titanic size. To help picture the problems involved it should perhaps be noted that many times special oversized transformer construction facilities have to be built to accommodate the ever increasing need for the high power isolation transformers and associated filters which are synonymous with higher power usage. Such new construction facilities or, minimally, expansion of old facilities drives the per unit cost to an unattractive figure which, however, at the present state of the art must be borne as the price of increased power. Although the transformer maintenance costs are relatively low, the cost of the space occupied by the transformer and the associated filtering units more than overshadows any maintenance savings.

The prior art attempts to eliminate the isolation transformer have proved to be complex, costly, unreliable and have consumed proportionately large amounts of power. Because of the relatively low frequencies involved, e.g., 60 cycles per second, high power rated, large space consuming, inefficient filter inductors and electrolytic capacitors were still required.

From the broad view, then, the well-known size of the diesels, gas turbines, isolation transformers and associated large low frequency filtering units makes it obvious that the frequency conversion schemes of the prior art occupied fantastically large amounts of space, were inefficient and were expensive to construct. The cost of construction when taken in connection with the cost with the space occupied by these units and the cost of the maintenance involved reaches an unbelievably high figure.

An object of this invention is, therefore, to obtain a completely solid state electronic frequency converter which does not require mechanical parts, isolation transformers, oversized filtered components or compensating networks.

A closely related object is to do so with the smallest physical system possible and at the same time achieve the advantages of simplicity, low cost, efficiency, and reliability.

The present invention is a frequency converter wherein circuit interrupters, such as controlled rectifiers, are switched at a relatively high frequency to simulate transformer isolation characteristics (i.e., the load is isolated from the line and vice versa at all times) with the isolated output thereof pulse-duration modulated to achieve frequency conversion. As in the copending application of P. W. Clarke, Serial No. 245,817, assigned to the same assignee and filed concurrently with this application, isolation is achieved by switching the circuit interrupting controlled rectifiers on an alternate time interval basis, i.e., energy is transmitted from the input source to an intermediate storage network during one interval and from there to the following stage (in this case, a modulator) on the following interval. During the first interval the load is isolated from the line while during the following second (alternate) interval the line is isolated from the modulator and the load. Complete isolation is thus achieved. Control circuit interrupters which also may be controlled rectifiers, are employed to "turn off" the isolation controlled rectifiers after a predetermined interval of conduction and thereby stabilize the frequency of operation. The output frequency is determined by still other controlled rectifier networks switched at the desired, easily adjustable, output frequency and wave form by a reference frequency and wave form source. Complete frequency and wave shape conversion flexibility is thus acquired. Since the isolating and modulating controlled rectifiers are switched at a relatively high frequency, only conventional "sized" filter components are required. The purity and stability of the output frequency and wave form is also such as to require little or no filtering, i.e., at most only conventionally sized components.

Other objects and features of the present invention will become apparent upon consideration of the following detailed description when taken in connection with the accompanying drawings:

FIG. 1 of which illustrates a simple embodiment of the invention, while

Figure 1:
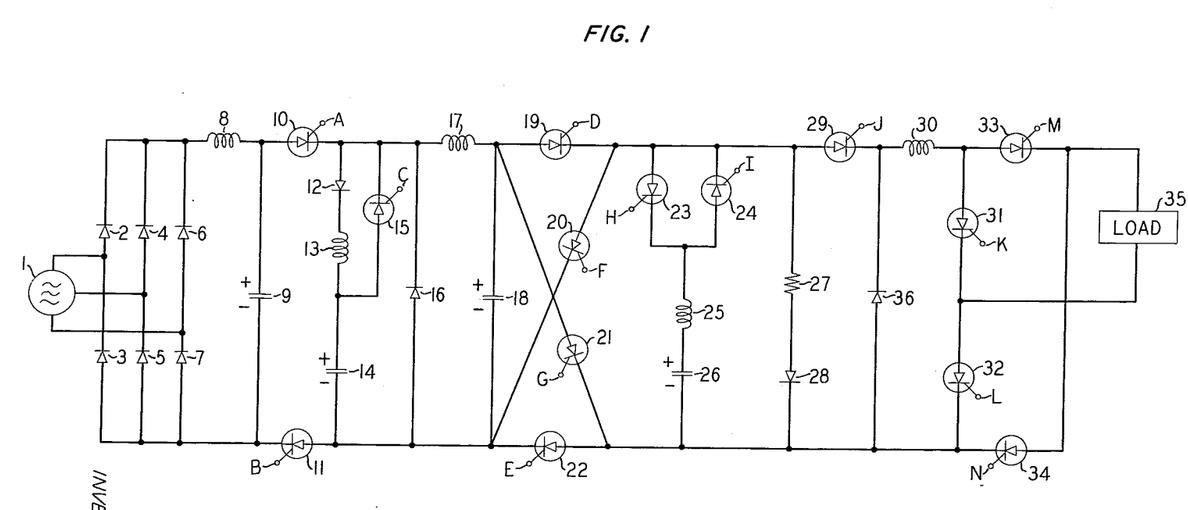

As can be seen from FIG. 1 of the drawing, there is provided a source of three-phase alternating-current potential 1, a three-phase input rectifier employing diodes 2, 3, 4, 5, 6, and 7, an input filter comprising inductor 8 and capacitor 9, a first "chopping" or isolation stage comprising controlled rectifiers 10 and 11 and associated "turn-off" network comprising diode 12, inductor 13, capacitor 14, and controlled rectifier 15, an energy storage network comprising inductor 17, capacitor 18, and fly-back diode 16, a second "chopping" or isolation stage comprising controlled rectifiers 19 and 22 with associated "turn-off" stage comprising controlled rectifiers 20, 21, 23, and 24, inductor 25 and capacitor 26, a "sustaining" or loading network comprising resistor 27 and diode 28, a modulator comprising controlled rectifier 29, a filter comprising inductor 30 and fly-back diode 36, a low frequency switch comprising controlled rectifiers 31, 32, 33, and 34, and a load 35.

Figure 2:
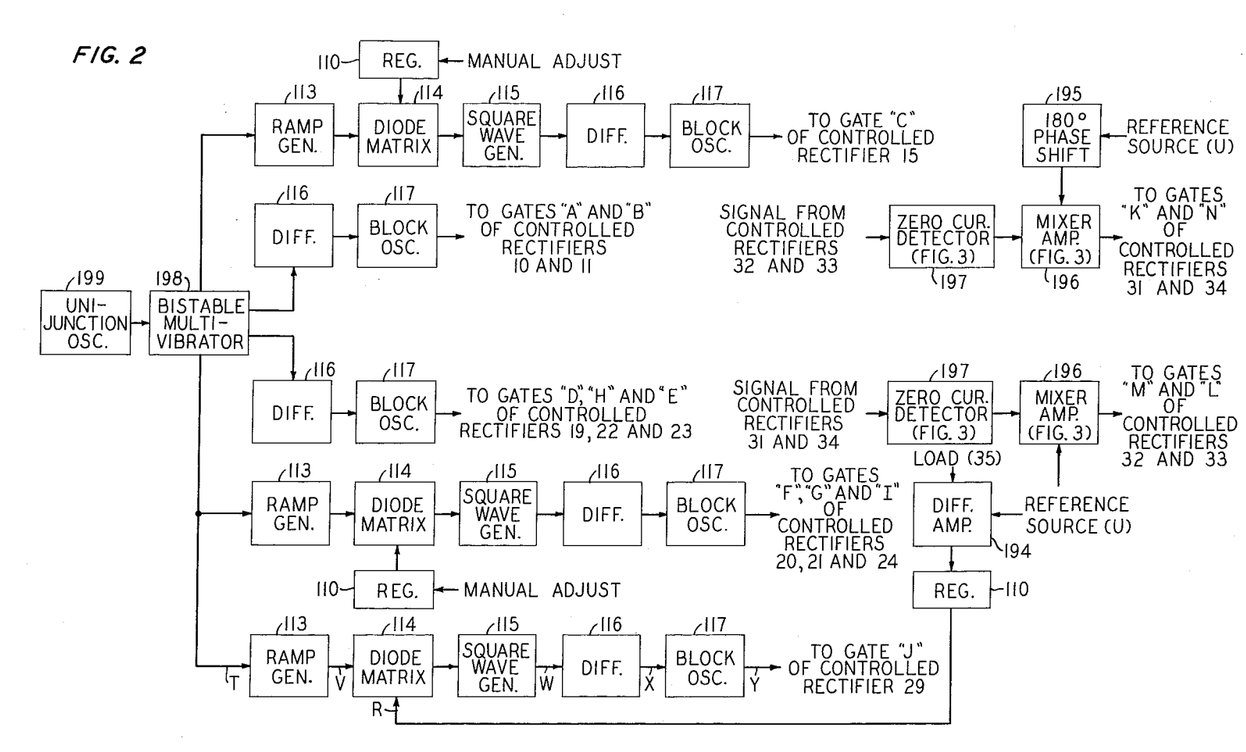
FIG. 2 illustrates the control circuitry associated with the embodiment of FIG. 1.

The control circuitry employed with the present invention is shown in FIG. 2. A conventional unijunction oscillator 199 is employed to provide the relatively high switching frequency for all, except the low frequency switch, controlled rectifiers. The output of the oscillator 199 is fed into a conventional bistable multivibrator 198. The unijunction oscillator 199-multivibrator 198 combination may be any such conventional configuration as, for example, the one shown in FIG. 4.17, section 4.14.3, page 53 of the General Electric Silicon Controlled Rectifier Manual, 2d Edition (1961). Boxes designated by numerical characters 110, 113, 114, 115, 116, and 117 may be any of the noted conventional circuits as, for example, those shown by the same numerical characters in the copending application of P. W. Clarke and J. A. Pirraglia, Serial No. 206,571, filed July 2, 1962, and assigned to the same assignee as the present invention. Since the foregoing noted circuitry is discussed at length in the application noted, it is not discussed further at this time except to note that the single phase conrol circuitry discussed in the copending application is employed in the "boxes" of FIG. 2 of the present application rather than the multiphase circuitry which is also discussed in the copending application. Boxes 195, 196, and 197 of FIG. 2 are discussed in detail hereinafter. The control functions of the circuit of FIG. 2 shall be discussed in connection with the operation of FIG. 1.

The operation of the circuit of FIG. 1 is as follows: Diodes 2, 3, 4, 5, 6, and 7 rectify and provide a return path for the three-phase alternating-current input source 1, with the rectified output filtered by inductor 8 and capacitor 9. Capacitor 9 thus charges to the potential of the input source, which for illustrative purposes is referred to as E, with the polarity shown on the drawings. Controlled rectifiers 10 and 11 are fired by a momentary positive pulse on the gate electrodes A and B, respectively, which is delivered by the noted section of the control circuitry of FIG. 2. The conduction of controlled rectifiers 10 and 11 permits a discharge current flow from the capacitor 9, through the anode-cathode path of controlled rectifier 10, blocking diode 12, inductor 13, capacitor 14, the anode-cathode path of controlled rectifier 11, and back to capacitor 9. The parameters of inductor 13 and capacitor 14 are chosen so as to operate in the well-known "ringing" manner, i.e., as the charging current to capacitor 16 starts to exponentially decrease, the charging voltage exponentially increases, while the opposite effect, also on an exponential basis, is occurring in the inductor 13. The inherent effect of the inductor is to attempt to sustain the charging current flow through capacitor 14, which thus charges to a potential twice the input potential. Since the input potential in this case was the potential appearing across capacitor 9 which was designated E, the potential appearing across the capacitor 14 must be 2E, with the polarity shown on the drawing. It should be noted at this point that the parameters of the control branch comprising inductor 13 and capacitor 14 are chosen such that capacitor 14 charges very quickly and consumes very little power in keeping with the over-all high speed and efficiency objectives of the present invention. After a predetermined interval of time which, as can be seen from the control circuit of FIG. 2, is a function of the preset frequency of unijunction oscillator 199 and the manual adjust predetermined position of the regulator 110 in the gating circuit of controlled rectifier 15, a firing pulse such as to initiate conduction in controlled rectifier 15 is delivered to the gate electrode C. When controlled rectifier 15 conducts, the cathode of controlled rectifier 10 is effectively raised to the potential 2E appearing across capacitor 14. Since the potential at the anode of controlled rectifier 10 is essentially the potential appearing across capacitor 9 or E, the inverse potential appearing across controlled rectifier 10 is equal to E and is such as to "back-bias" controlled rectifier 10 into the nonconductive condition. When controlled rectifier 10 ceases to conduct, there is no longer any forward current flow through controlled rectifier 11, hence this controlled rectifier is also biased out of conduction. As noted, during the conduction of controlled rectifiers 10 and 11, only a minimal amount of power was drawn by the turn-off network which comprises diode 12, inductor 13, capacitor 14 and controlled rectifier 15. For all practical purposes then, all of the power delivered during the conduction intervals of controlled rectifiers 10 and 11 from the rectifier diode matrix is thus transferred to the energy storage network comprising inductor 17 and capacitor 18. Fly-back diode 16 serves to quickly discharge the energy stored in this network once controlled rectifiers 19 and 22 are rendered conductive.

Controlled rectifiers 19 and 22 are rendered conductive by a short duration positive pulse from the control circuitry of FIG. 2 which is applied to gate leads D and E, respectively, at a time after controlled rectifiers 10 and 11 are nonconductive, as discussed heretofore. If controlled rectifier 29 is nonconductive, capacitor 18 discharges through resistor 27 and forward-biased diode 28. (This network also performs an important function when controlled rectifier 29 is conducting as shall be discussed hereinafter.) If controlled rectifier 29 is conductive, energy is transmitted to the filter network comprising inductor 30 and fly-back diode 36 and from there to the switching network comprising controlled rectifiers 31, 32, 33 and 34 and the load 35 in a manner to be discussed in detail hereinafter.

Conductivity through controlled rectifier 29 is initiated by applying a short duration positive pulse to the gate lead J. As can be seen from the control circuitry of FIG. 2, this pulse is under the control of load voltage variations and a source of reference frequency, the exact operation of which shall be discussed in detail hereinafter. At this point, it appears to be sufficient to note that controlled rectifier 29 conducts only on a pulse duration modulation type cycle, that is, a firing pulse is delivered to the gate electrode J in accordance with a reference signal. In a preferred embodiment the frequency of the firing pulses thus applied will be equal to the repetition rate of the firing pulses delivered to controlled rectifiers 10, 11, 15, 19, 20, 21, 22, 23 and 24 as shall be apparent from the discussion hereinafter. Each time the pulsating current through controlled rectifier 29 falls to zero, the nonconductive condition of this controlled rectifier is initiated. The effect, then, of the frequency controlled firing signal in combination with the zero turn-off feature is such as to result in pulse position modulation. The exact modulation operation is discussed in detail hereinafter.

Assuming that controlled rectifier 29 is conducting, capacitor 18 will discharge through the anode-cathode path of this controlled rectifier into filter conductor 30 via either reference frequency controlled circuit interrupting controlled rectifiers 31 and 34 or 33 and 32. The capacitance of capacitor 18 in the preferred embodiment will be such that capacitor 18 will not have time to fully discharge before controlled rectifiers 19 and 22 are biased out of conduction. Before the manner in which controlled rectifiers 19 and 22 are biased out of conduction is discussed, it should be noted that controlled rectifier 23 is "fired" simultaneously with controlled rectifiers 19 and 22 (as can be seen from the control circuitry of FIG. 2 wherein gate electrodes D, H and E of controlled rectifiers 19, 22 and 23, respectively, are supplied with the same firing pulse). Capacitor 26, therefore, charges to a polarity which is twice the polarity of the voltage appearing across capacitor 18 because of the "ringing" characteristic of inductor 25 and capacitor 26 as discussed in connection with inductor 13 and capacitor 14. The polarity to which capacitor 26 charges is as noted on FIG. 1 of the drawing.

Controlled rectifiers 20, 21 and 24 are, as can be seen from the control circuitry of FIG. 2, rendered simultaneously conductive by applying the same short firing pulses to each of the gates F, G and I, respectively. These controlled rectifiers, in turn, serve to bias controlled rectifiers 19, 22, and 23 out of conduction in the following manner: The positive potential appearing across capacitor 26 which, as discussed, is twice the potential appearing across capacitor 18, is applied through controlled rectifier 24 to the cathode of controlled rectifier 19 in a manner similar to the "turn-off" scheme of controlled rectifier 10. Since the potential appearing across capacitor 26 is essentially twice that appearing across capacitor 18, controlled rectifier 19 is "back-biased" by a potential equal to the potential appearing across capacitor 18 and is thus biased out of conduction. When current ceases to flow through controlled rectifier 19 it also ceases to flow through controlled rectifier 22 and hence this controlled rectifier is also biased out of conduction. If necessary, as discussed hereinafter, controlled rectifier 23 will also be biased out of conduction by the conduction of controlled rectifier 24 since the conduction of controlled rectifiers 20 and 24 places the positive potential appearing across capacitor 26 on the cathode of controlled rectifier 23. Since controlled rectifier 21 places the potential appearing across capacitor 18 across controlled rectifier 22, this controlled rectifier is also "back-biased" by a potential E. Controlled rectifiers 20, 21 and 24 conduct until capacitor 26 discharges which is a comparatively very short interval of time since there is an all but resistance-free discharge path. When capacitor 26 is discharged, there is no longer any forward current sustaining flow in controlled rectifiers 20, 21 and 24 and they are biased out of conduction. The need for resistor 27 and blocking diode 28 should now be apparent. This network which is forward or conductively biased when controlled rectifiers 19, 22 and 23 are conducting provides a "loading" or sustaining path to keep forward current flowing through controlled rectifiers 19 and 22 long after the comparatively instant charge of capaictor 26 to twice the potential appearing across capacitor 18. For this reason controlled rectifier 23 is usualy biased out of conduction (due to lack of forward sustaining current flow) long before controlled rectifiers 19 and 22 cease to conduct. During the conduction intervals of controlled rectifiers 20, 21 and 24, diode 28 serves as a blocking device and effectively removes the network from the circuit. The sustaining or "loading" network comprising resistor 27 and diode 28 is also necessary to sustain the current flow from capacitor 18 to the modulating controlled rectifier 29. If it were not for this network, when the modulator controlled rectifier 29 ceased to conduct (for reasons discussed hereinafter) during the conduction interval of controlled rectifiers 19 and 22, there would no longer be any forward sustaining current flow through controlled rectifier 19 and it would thus cease to conduct. It should be noted that the turn-off network used in connection with controlled rectifier 10 could also be used for controlled rectifier 19. It has been found, however, that the present network is more efficient and greatly increases the accuracy of modulation, hence, the frequency conversion. For these reasons, in accordance with the over-all objectives of the invention, the present scheme appears preferential.

It should be noted at this point that when controlled rectifiers 10 and 11 are conducting, controlled rectifiers 19 and 22 are not and vice versa thereby isolating the source from the load and the load from the source at every instant in the cycle of operation. The circuit interrupting switching elements 10, 11, 19 and 22 are switched at a frequency many times in excess of the input frequency which thereby eliminates the need for the large oversized filter components of the prior art. The energy storage stage comprising inductor 17 and capacitor 18 performs the additional function of providing a filter action which thereby both eliminates input frequency ripple (as does inductor 8 and capacitor 9) and to reduce ripple due to the switching frequency of controlled rectifiers 10 and 11. It should be clear that isolation could be achieved with only two circuit interrupters, i.e., controlled rectifiers 10 and 19 while controlled rectifiers 11 and 22 are eliminated. The preferred embodiment of FIG. 1 employs four controlled rectifiers to insure isolation and prevent any "sneak" discharge paths due to the relative phases of the input supply.

Figure 3:
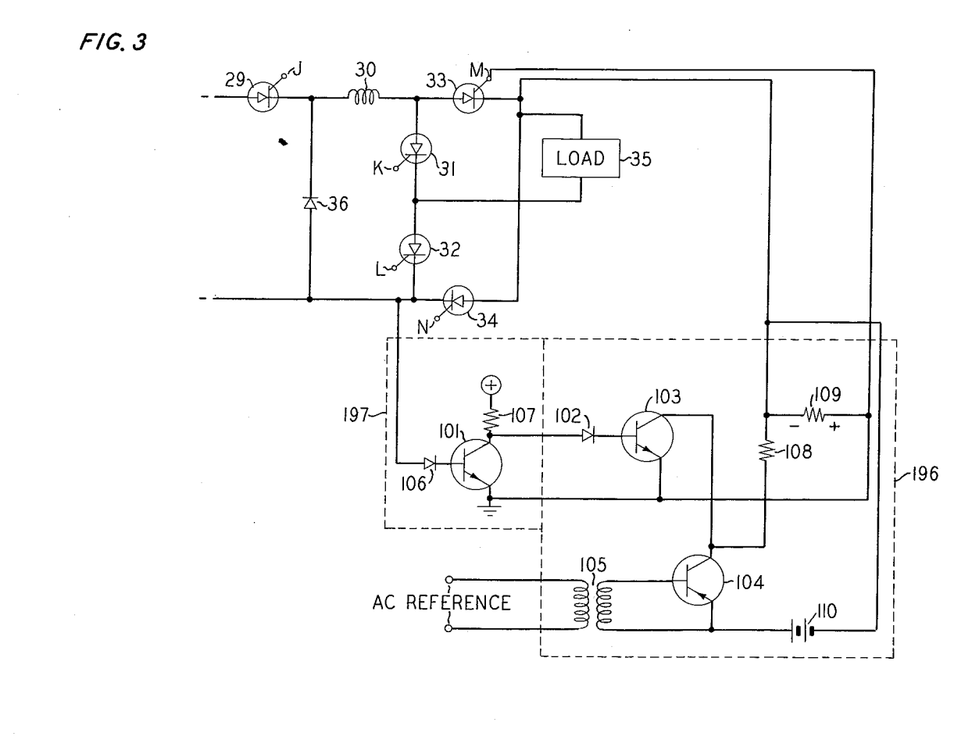
FIG. 3 represents the circuitry of "boxes" 196 and 197 of the control circuitry of FIG. 2.

The output of the second "chopping" or isolation stage comprising controlled rectifiers 19 and 22 is fed to the modulating controlled rectifier 29. To fully understand the operation of the modulating and low frequency stages it appears necessary at this point to discuss the zero current detector box 197 and the mixer amplifier box 196 of FIG. 2. The differential or difference amplifier box 194 shown on FIG. 2 may be any such conventional configuration as, for example, the one shown in FIG. 5.13, page 152 of the text Transistor Circuit Engineering, R. F. Shea, 1957, published by John Wiley and Sons. As can be seen from FIG. 2 of the present application the reference frequency source forms one input to the different amplifier while a portion of the voltage appearing across the load or the "feedback" (closed loop) voltage the other input. For present purposes, it appears sufficient to note that the difference amplifier compares these inputs and, as the name implies, delivers an output signal which is the "difference" of the input signals. As can be seen from the control circuit of FIG. 2 this signal is, in turn, fed to a regulator the effect of which shall be discussed in connection with "boxes" 196 and 197. FIG. 3 of the drawings illustrates "boxes" 196 and 197 in detail.

Figure 4:
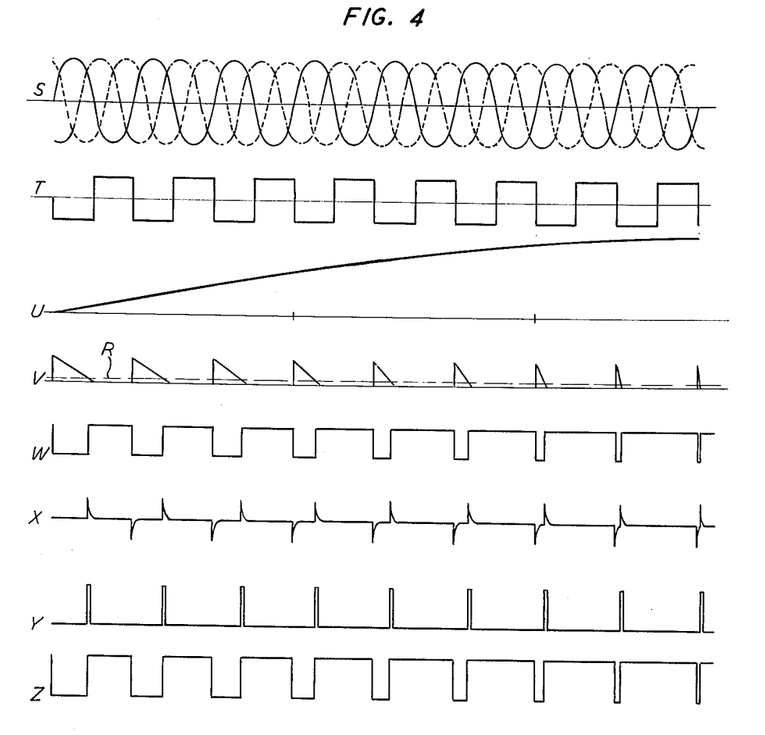
FIGS. 4 and 5 represent the wave forms associated with the inventive concepts of FIG. 1 and the control circuitry of FIG. 2.

FIG. 3 of the drawings also illustrates a portion of FIG. 1 which includes modulating controlled rectifier 29, inductor 30, fly-back diode 36, the low frequency switch controlled rectifiers 31, 32, 33 and 34 and the load 35, for orientation purposes. In connection with the operation of the circuits of FIG. 3 it is first useful to refer to the wave shapes shown on FIG. 4 of the drawings which ilustrates the sequence which results in the firing or modulating signals being delivered to the gate lead J of controlled rectifier 29. In FIG. 4 wave shape S represents the three phases of the alternating-current input source 1, the first of said phases being shown as a solid line, the second as long and short dash line, and the third as a dotted line. Wave shape T of FIG. 4 is the wave shape appearing at the output of bistable multivibrator 198 shown on FIG. 2. Wave shape T is, in turn, fed into the ramp function generator 113. It should be noted in passing that the intervals in which controlled rectifiers 10 and 11, and 19 and 22, respectively, conduct are approximately represented by wave shape T, i.e., controlled rectifiers 10 and 11 will conduct during positive excursions while controlled rectifiers 19 and 22 conduct during negative excursions. It should be remembered, however, that this is only on an approximate basis, which nevertheless should aid in the over-all understanding of the system.

As discussed heretofore, each of the numerals on the blocks in the diagram of FIG. 2 with the exception of boxes 194, 195, 196 and 197 refer to any such conventional circuitry as, for example, that disclosed in the noted copending application. As noted, the modulating controlled rectifier 29 is fired in accordance with load voltage variations as well as the alternating-current reference signal. The alternating-current reference signal is a signal which possesses the desired frequency and wave form of the output signal and for illustrative purposes only is shown as sine wave wave shape U on FIG. 4. Only a portion of this sine wave wave shape is shown so as to illustrate the high to low frequency conversion capabilities of the present invention, as is easily seen from a comparison of wave shapes S and U of FIG. 4. The process of this conversion is discussed in detail hereinafter. Referring back to the block diagram of FIG. 2 and the firing pulses delivered to gate lead J of controlled rectifier 29, we see that the output of the ramp function generator 113 and regulator 110 networks are fed into the diode matrix 114. As can be seen from wave shapes U and V of FIG. 4 the length of time it takes the ramp function to relax to the level R determines the conductivity of the square wave generator 115 which is connected to the output of the diode matrix. The relationship of the output of the diode matrix 114 to the square wave generator 115 can be easily seen from a comparison of wave shapes V and W, the latter of which represents the output of the square wave generator. The length of time it takes the ramp function to relax is controlled by the regulator 110 which is, in turn, under the control of alternating-current reference signal (wave shape U) and the load voltage variations as discussed heretofore. As noted, the effect thereof is easily seen from a comparison of wave shapes U and V. As the sine wave wave shape U becomes progressively more positive, the period of time required for the ramp (wave shape V) to relax is progressively less to the point where the sine wave signal wave shape U reaches its maximum value and the ramp function becomes approximately a finite value of time. To reiterate, the period of time it takes the reference signal (U) controlled ramp signal (V) to relax to the level R determines the output (W) of the square wave generator as can be seen by comparing wave shapes V and W. The output of the square wave generator is then fed into a differentiator circuit 116 the output of which is shown as wave shape X. The positive output spikes of the differentiator in turn "trigger" a blocking oscillator 117 which delivers a firing pulse to the gate electrode J of controlled rectifier 29, as shown by wave shape Y. The intervals in which controlled rectifier 29 are conducting are shown by wave shape Z. It should be carefully noted that the intervals in which controlled rectifier 29 are conducting vary proportionately with the sine wave reference wave shape U. The wave shape of the voltage or energy transmitted through controlled rectifier 29 will, of course, be identical to the conduction interval wave shape Z of FIG. 4. This voltage or energy is, in turn, integrated by inductor 30. The effect of this integration is to sum the volt-second area of the pulses shown by wave shape Z such that as the "off" intervals of controlled rectifier 29 become less and less while the area of the resultant wave shape become greater and greater. Since the integration serves to smooth (while summing) the variations, the wave shape appearing across the load 35 is essentially the wave shape U. This is easily proven electrically or graphically by taking the pulses of wave shape Z and integrating them into ramp functions of an equal volt-second area and adding the same. As is seen from wave shapes U and Z the sum of the volt-second area of both wave shapes U and Z is very small at the time the sine wave reference wave shape U is crossing the zero axis. The volt-second area at each instant in the cycle of each wave shape then increases sinusoidally (remembering that wave shape Z is under control of wave shape U) until a sinusoidal wave shape appears across load 35 which approximates wave shape U.

Figure 5:
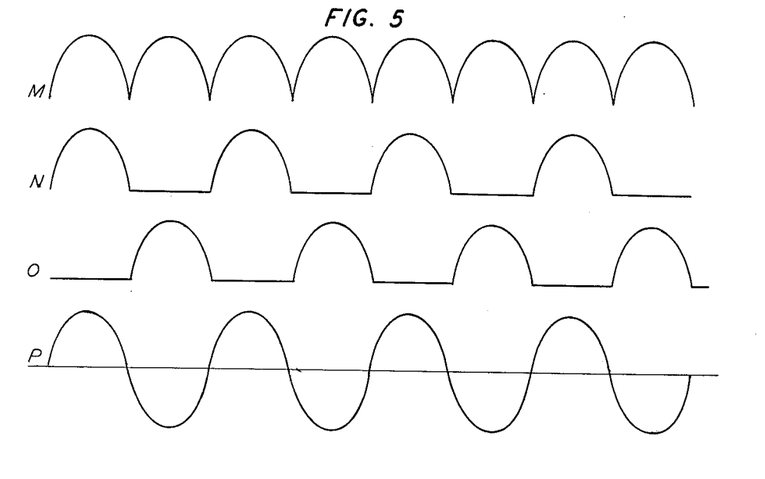

The wave shape appearing at the input of the low frequency switch is shown as wave shape M on FIG. 5, on a greatly reduced (approximately 1 to 20) scale from FIG. 4. Wave shapes N and O of FIG. 5 represent the current flowing through low frequency switch controlled rectifiers 32 and 33 and 31 and 34, respectively, while wave shape P represents the current flowing through the load. How these latter wave shapes are derived will best be seen by referring to FIG. 3. As noted, for orientation purposes, FIG. 3 shows the modulating controlled rectifier 29, the fly-back diode 36, the low frequency switching controlled rectifiers 31, 32, 33, and 34, and the load 35. The circuit of FIG. 3 only illustrates the zero current detector 197 and mixer amplifier 196 associated with controlled rectifier 34. It should be understood that controlled rectifier 32 would also have a similar network associated therewith for reasons which will become apparent from the following discussion.

The operation of the zero current detector 197 and mixer amplifier 196 in FIG. 3 can best be understood by assuming that controlled rectifiers 31 and 34 are conducting while controlled rectifiers 32 and 33 are not. The voltage wave shape across these controlled rectifiers is shown as wave shape O on FIG. 5. Assuming, for present purposes, that controlled rectifier 34 is conducting during each positive excursion of wave shape O from the zero reference axis, blocking diode 106 and the base-emitter electrodes of transistor 101 will thereby be biased into conduction by the voltage drop across controlled rectifier 34. If the parameters are chosen such that transistor 101 is immediately biased into the saturation mode of operation, the collector-emitter voltage drop of transistor 101 in such mode of operation is approximately zero and hence insufficient to bias blocking diode 102 and the base-emitter electrodes transistor 103 into conduction. As the voltage across controlled rectifier 34 falls to zero, however, there is no longer any bias across blocking diode 106 and transistor 101 and this transistor thus ceases to conduct. When transistor 101 ceases to conduct, transistor 103 is biased into conduction via the potential impressed across resistor 107, diode 102, and the base-emitter electrodes of transistor 103. It should be noted from a comparison of wave shapes N and O of FIG. 5 that when the voltage across controlled rectifiers 31 and 34 falls to zero on the negative excursion, the voltage across controlled rectifiers 32 and 33 rises from zero on the positive excursion, i.e., the controlled rectifiers conduct on alternate intervals for approximately 180 degrees in time. The frequency of the conduction intervals of the controlled rectifiers is equal to the alternating-current reference frequency as discussed heretofore in connection with FIG. 2.

When transistor 103 conducts the signal appearing at the emitter electrode of transistor 104 (which is under the control of the alternating-current reference signal via transformer 105) is transmitted to resistors 108 and 109. The polarity of the potential which thus appears across resistor 109 is as noted in the drawing. This potential (across 109) is applied to controlled rectifier 33 to "gate" controlled rectifier 33 into conduction. Thus, controlled rectifier 33 is rendered conductive as soon as the potential across controlled rectifier 34 falls to zero. This zero detection and switching technique provides a means for transmitting the pulsating wave shape N of FIG. 5 through the load in opposite directions, i.e., the pulses N are transmitted through the load in one polarity direction while the pulses of wave shape O, which are 180 degrees in time out of phase with the pulses of wave shape N, are transmitted through the load in the opposite polarity direction. The resultant load voltage is as shown by wave shape P in FIG. 5. This wave shape is thus a pure sine wave the frequency of which is equal to the frequency of the sine wave reference signal. Frequency and wave shape conversion is thus achieved. It should be obvious at this point that if the zero current detection were not provided, one set of controlled rectifiers would provide continuous pulses of one polarity to the load. Two zero current detection networks are required, one for controlled rectifier 34 and another for controlled rectifier 33, such as shown on FIGS. 2 and 3. The 180-degree phase shift noted in box 195 on FIG. 2 could be obtained by any such network, e.g., a transformer or even by eliminating the transformer 105 of FIG. 3. Once the current through each of the low frequency switch controlled rectifiers falls to zero (on alternate pulses) the controlled rectifiers will stop conducting and will thus be prepared for the next firing pulse.

It should be noted at this point that although in the sine wave conversion illustration discussed heretofore an output "bridge" switch network was required, for other wave form outputs such a network may not be required. It should be also clear that for certain wave form outputs less than four controlled rectifiers may be required in the input switch, e.g., diodes could be substituted for two of the controlled rectifiers for certain outputs.

It appears to be useful at this point to reflect back upon and summarize the operation of the circuit of FIG. 1 and the frequency and wave form conversion process thereof. The three-phase, relatively low frequency, alternating-current input was rectified and filtered. The input energy was then transmitted to an intermediate energy storage network by a pair of controlled rectifiers. At each instant during the energy transmission process the load was isolated from the input supply and vice versa. Because of the high switching frequency involved, only conventional sized filter and energy storage networks were required. Since isolation was accomplished without an input isolation transformer, the current and voltage phase shift introduced by the transformer was eliminated and thus high speed positive switching of the isolation controlled rectifiers became feasible in accord with the small conventional sized filter component objective of the invention. On the alternate intervals when the first pair of controlled rectifiers are not conducting, the energy stored in the intermediate energy storage network is transmitted by a second pair of controlled rectifiers to a modulator stage which pulse duration modulates the energy so transmitted under control of an alternating-current reference signal. The volt-second area of the pulses so modulated was then integrated by an inductor to an output approximation of a rectified sinusoid. A low frequency switch, controlled by the reference frequency, was operated so as to simulate positive and negative excursions of the reference signal and thereby obtaining frequency conversion. It should be clear that a switching network may not be required for certain output wave forms, as for example, a ramp function output. Since the output wave form and frequency is under the control of the easily adjusted reference wave form and frequency source, flexible and precise wave form and frequency conversion is thus easily obtained. It should be noted that voltage regulation is easily achieved in the inventive structure by prematurely terminating the conduction of the isolation controlled rectifiers. The isolation feature provides for positive action of the modulating and low frequency switch controlled rectifiers, for transient and ripple isolation and prevents the switching frequency and wave form variations of the modulating and low frequency switch stages from appearing back in the input source. Additionally, the power factor disadvantages of the prior art due to the isolation transformer are completely eliminated as are all the large, expensive, inefficient, and space consuming (low) frequency converter parameters of the prior art. Eliminating the power factor problem (i.e., the present invention presents a power factor of substantially unity to the source) in turn decreases the power requirements of the source since now the kva. rating need only equal the kw. rating (rather than be larger).

FIG. 2 represents a second embodiment of the invention wherein the positive switching action and transient suppression characteristics of the invention are improved, especially when reactive loads are supplied. Each of the two-digit numerical designations of FIG. 6 refers to the same elements in FIG. 1 and, as such, are not discussed further at this time. Three-digit designations all begin with the digit 2 and refer to components making either their first or different functional appearances in FIG. 6. The arrows with the designations X—X in FIG. 6 refer to a source of alternating current other than that of the source 1 which is employed to improve the switching action of the circuit in a manner discussed hereinafter. The circuit of FIG. 6 functions substantially in the same manner as the circuit of FIG. 1 with the major elements having the same designation and performing the same function as in FIG. 1. The turn-off, modulating and low frequency switch stages are somewhat modified to improve the over-all circuit performance.

The turn-off circuit for controlled rectifier 10 comprises controlled rectifiers 15, 201, and 202 and capacitor 14 as well as the alternating-current source associated therewith, which, for simplicity, is represented by the arrows X—X. The turn-off circuit for controlled rectifier 19 comprises controlled rectifiers 24, 203, and 204 and capacitor 26 and alternating-current source X—X. The turn-off circuit for controlled rectifier 29 comprises controlled rectifiers 206, 209, 210, capacitor 208, and alternating-current source X—X. Since the operation of each of these turn-off networks is the same in each instance, only the turn-off circuit employed in connection with controlled rectifier 10 will be discussed.

Figure 6:
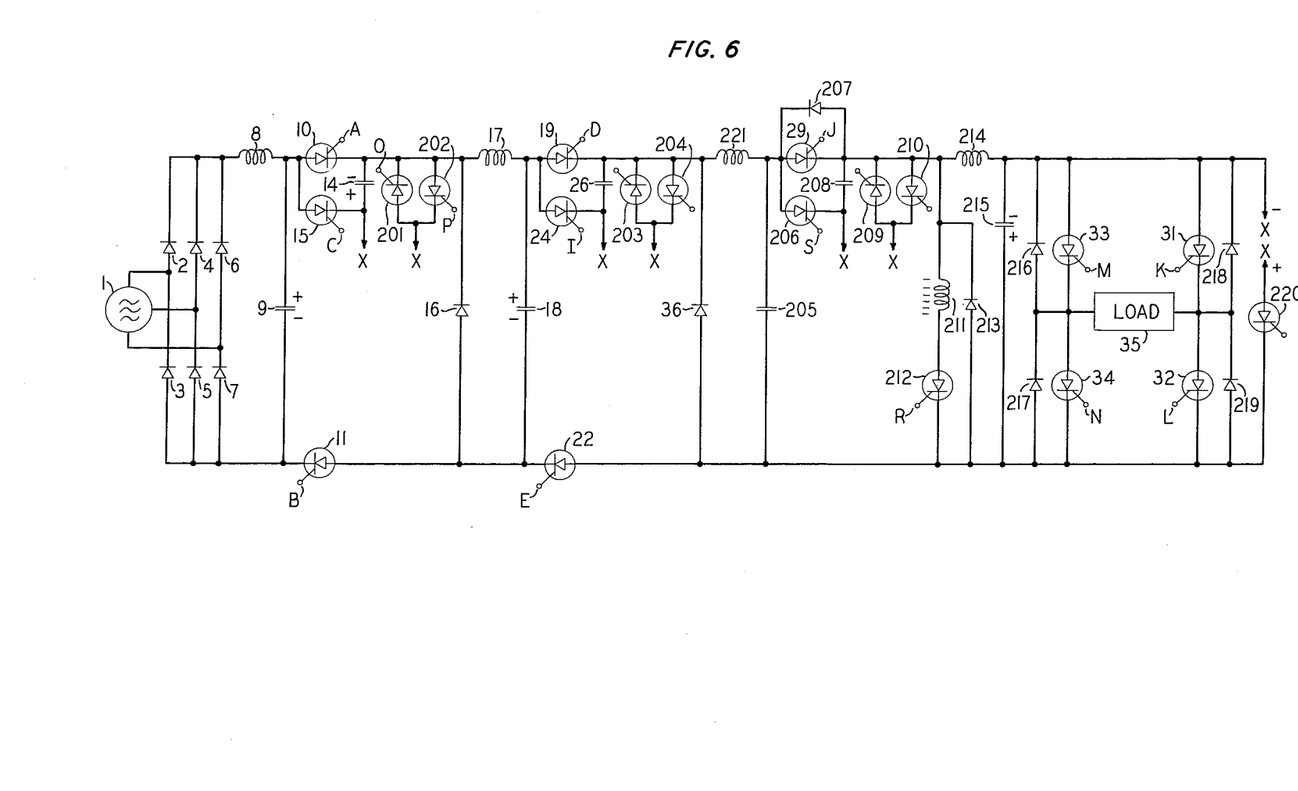
FIG. 6 illustrates a second improved embodiment of the invention of FIG. 1.
Figure 7:
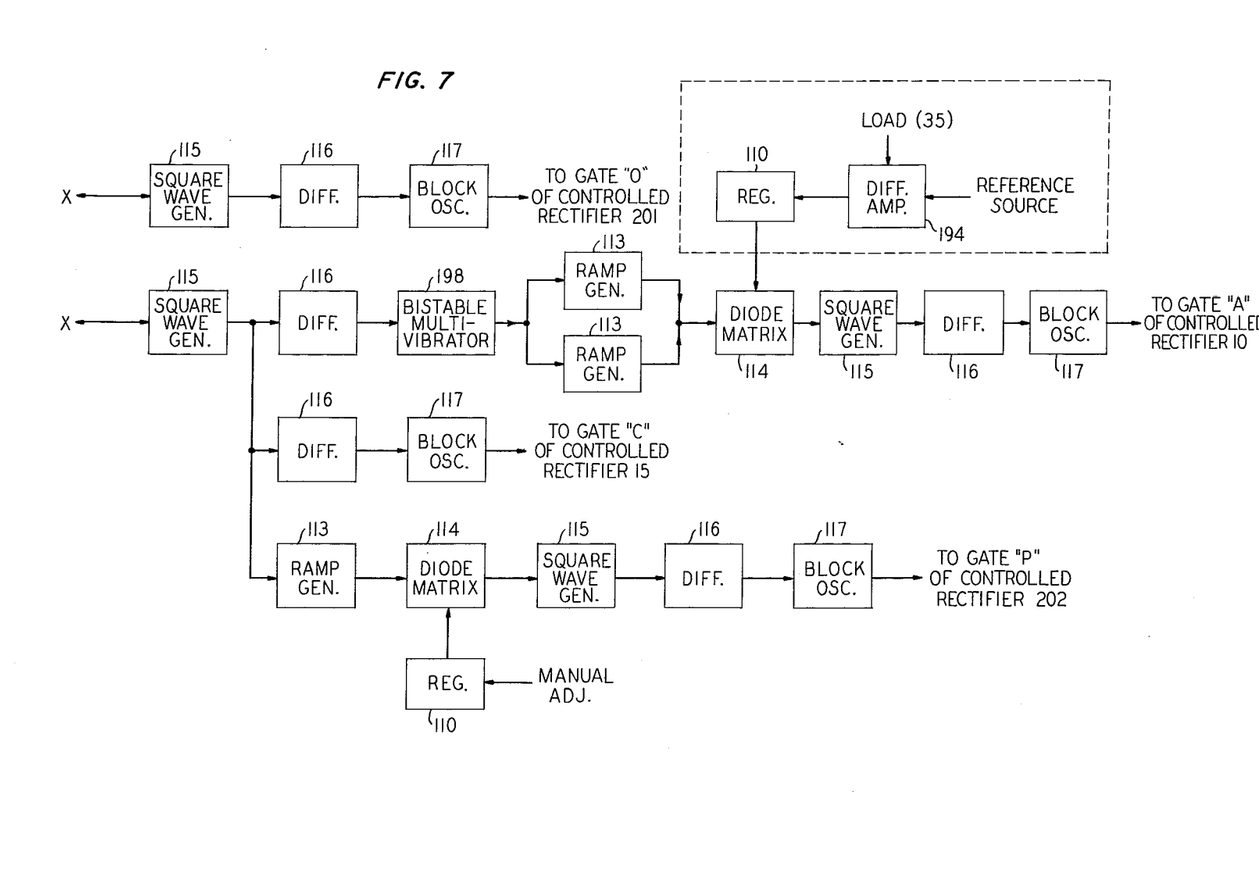
FIG. 7 represents the additional control circuitry of the embodiment of FIG. 6.

The control circuitry for each of controlled rectifiers 10, 19, and 29 is shown on FIG. 7 and is also the same for each of the controlled rectifiers, with the exception that the portion of the controlled circuitry shown in the dotted box pertains only to the modulating controlled rectifier 29, the reasons thereof being readily apparent from the foregoing discussion of FIGS. 1 and 2. In FIG. 7, as in FIG. 6, the designation X—X refers to an alternating-current source the voltage output of which will be higher than the voltage output of the three-phase input alternating-current supply 1 in a preferred embodiment.

The operation of the circuit associated with controlled rectifier 10 and the control circuitry employed therewith can best be understood by assuming that a positive firing pulse is applied to the gate electrode A of controlled rectifier 10 to bias it into conduction. The sequence and manner of operation of controlled rectifiers 10, 19, and 29 is the same as discussed in connection with FIG. 1. During the interval that controlled rectifier 10 is conducting, a positive pulse is applied to the gate electrode P of controlled rectifier 202 from the control circuit shown in FIG. 7 (as determined by the manual adjustment) to quickly change the capacitor 14 to a potential of the polarity noted on FIG. 6. Controlled rectifier 10 continues to conduct until a positive pulse is delivered to the gate electrodes C and O of controlled rectifiers 15 and 201, respectively, by the control circuit of FIG. 7. The conduction of controlled rectifier 201 places the positive potential appearing across capacitor 14 on the cathode electrode of controlled rectifier 10 and thereby biases controlled rectifier 10 out of conduction. The conduction through controlled rectifier 15 sustains the polarity of the charge on capacitor 14 for a period of time sufficient to insure the turn-off of controlled rectifier 10. Capacitor 14 discharges and charges through controlled rectifier 201 from the alternating-current source X—X to a polarity opposite to that to which it was first charged. This charge "back-biases" controlled rectifier 15 out of conduction since in a preferred embodiment the alternating-current generator X—X will have a higher voltage output than that of the alternating-current input source 1. Due to the low resistance in the charging and discharging path, capacitor 14 will discharge and charge relatively rapidly, i.e., before a positive firing pulse is delivered to the gate electrode A of controlled rectifier 10 to bias it into conduction. Once capacitor 14 is fully charged there is no longer any forward sustaining current flow through controlled rectifier 201 and the controlled rectifier is biased into cutoff. Since as noted heretofore, the "turn-off" operation is the same for controlled rectifier 19 and the associated network comprising controlled rectifiers 24, 203, 204, and capacitor 26, as well as for controlled rectifier 29 and its associated "turn-off" network comprising controlled rectifiers 206, 209, and 210, and capacitor 208, they are not discussed further. As in the operation of FIG. 1, when controlled rectifiers 10 and 19 are biased out of conduction controlled rectifiers 11 and 22, respectively, also cease to conduct. It should be noted that although in FIG. 1 the filter network comprising inductor 30 and fly-back diode 36 was connected to the output of the modulator stage, is connected to the output of the second isolation stage in FIG. 2, with the addition of filter capacitor 205. The reasons therefor are to allow the modulating controlled rectifier 29 to work from a "pure" direct-current output rather than a pulsating output as in FIG. 1. Since controlled rectifier 29 is now working from a "pure" direct-current input, this controlled rectifier requires a turn-off network which was not required in the configuration of FIG. 1 wherein the modulating controlled rectifier was biased out of conduction each time the pulsating input fell to zero. It has been found that with such a "pure" direct-current input, more positive modulator action is obtained which in turn results in an improvement in the output wave form. It should be obvious that the modulator and switching portions of the circuit of FIG. 6 will function as a direct-current to alternating-current frequency converter, if a direct-current source were substituted for capacitor 205. (There would, of course, be no phase shift problems in such a circuit and the portions of the circuits employed to compensate for phase shift, as discussed hereinafter, could be eliminated.)

As can be seen from a comparison of FIGS. 1 and 6, the configuration of FIG. 6 has an additional modulator output filter network comprising fly-back diode 213, inductor 214 and capacitor 215. Also readily apparent is the addition of a controlled rectifier 212 and saturable inductor 211 in series across the fly-back diode 213. The reasons for the addition of these elements shall be deferred until the reasons for addition of diodes 216, 217, 218, and 219 are discussed, at which time the operation of the preceding elements shall be more easily understood.

As is well known, when an inductive or capacitive load is supplied, there is a phase difference between the load current and voltage. This phase differential leads to many problems in switching type circuits wherein a precise switching action is desired due to the fact that the switching devices tend to remain conductive after the, for example, voltage has fallen into the negative region (passed the zero axis) while the current is still in the positive region. If, as in the present invention, it is desired to switch at the voltage zero crossing, some means must be devised to accommodate the current lead or lag so that a first device may be switched into the nonconductive condition while a second device is switched into conductive condition without excessive current transients. This is the function served by diodes 216, 217, 218, and 219 in FIG. 6. To understand the function of these diodes, it is first necessary to discuss the "turn-off" network of controlled rectifiers 31, 32, 33, and 34, which comprises controlled rectifier 220 and the alternating-current source X—X.

When the voltage across controlled rectifier 34 falls to zero, its opposite member, controlled rectifier 33, is "triggered" into conduction as discussed in connection with FIG. 1. In the configuration of FIG. 6, controlled rectifier 220 will be triggered into conduction simultaneously with controlled rectifier 33. Capacitor 215 charges through the anode-cathode path of the controlled rectifier 220 to the potential of the alternating-current source X—X. The potential appearing across capacitor 215 due to the charging path through controlled rectifier 220 is of the polarity noted in the drawing, and as is readily seen from the circuit of FIG. 6, is of a polarity opposite to the polarity to which capacitor 215 is normally charged by the output of the modulating stage comprising controlled rectifier 29. When the positive potential appearing across capacitor 215 is applied to the cathode electrode of controlled rectifier 34 the controlled rectifier is biased out of conduction. Similarly, when the potential across controlled rectifier 32 falls to zero in the interval during which controlled rectifiers 32 and 33 are conductive, controlled rectifier 220 will again be biased into conduction and cause a positive potential to appear at the cathode of controlled rectifier 32 thereby biasing it out of conduction. Returning to the case where controlled rectifier 34 is conducting and is back-biased out of conduction by the potential appearing across capacitor 215, it is seen that diodes 217 and 218 are biased into conduction by the potential appearing across capacitor 215. Diodes 216 and 219 are "back-biased" by the forward voltage drop across controlled rectifiers 33 and 32, respectively, the latter of which begin to conduct when controlled rectifiers 31 and 34 cease to conduct as discussed in connection with FIG. 1. Thus, the capacitor 215 will discharge through diode 217, the load 35, and diode 218. The current flow thus initiated through the load 35 is opposite to the direction of current flow through the load when controlled rectifiers 31 and 34 were conducting and thus opposes any phase lag of current behind the voltage. The same sequence except for the different directions of current flow through the load will occur through diodes 216 and 219 when the other pair of controlled rectifiers 32 and 33 are being biased out of conduction. Filter inductor 214 and fly-back diode 213 perform a filtering action similar to that of inductor 30 and diode 36 discussed in connection with FIG. 1. The inventive concepts of FIG. 6 thus provide for sharp switching action and exact frequency and wave form conversion. As discussed heretofore, it should be noted that the turn-off networks associated with each of the controlled rectifiers consume only relatively small amounts of power due to the absence of resistive elements. (There are none in the main circuits of FIG. 1 or 6.) The relatively small values of the reactive components and the circuit balance (i.e., inductive v. capacitive) are such that the load and the source "looks-into" a circuit with substantially a unity power factor in accordance with the objectives of the invention. As such the kva. rating of the source need only equal kw. rating, representing a considerable input source savings (i.e., highly reactive circuits require a kva. source rating many times in excess of the kw. or usable power rating).

Charging capacitor 215 to a potential other than that supplied by the output of the modulating controlled rectifier 29 has been found to introduce another problem however, in that it introduces distortion into the output wave form. To alleviate the problem, saturable inductor 211, controlled rectifier 212, and diode 207 are added to the circuit. Controlled rectifier 212 is triggered into conduction by a positive pulse on gate lead R simultaneously with the firing pulse applied to the gate lead S of controlled rectifier 206. As discussed heretofore, controlled rectifiers 206 and 209 are pulsed "on" simultaneously to bias controlled rectifier 29 out of conduction. Controlled rectifier 206 begins to conduct immediately after being "pulsed" into conduction. Saturable inductor 211 in series with controlled rectifier 212, however, delays the conduction through controlled rectifier 212 in the well-known manner, i.e., due to the $di/dt$, characteristics of the saturable inductor. The saturable inductor 211 thus insures that controlled rectifier 29 has been biased out of conduction before controlled rectifier 212 is biased into conduction. Conduction through controlled rectifier 212 provides a quick discharge path for the original potential (due to the conduction through controlled rectifier 29) stored in capacitor 215 and inductor 214. Diode 207 also serves to transmit some of the energy stored in capacitor 215 and inductor 214 to capacitor 205. The opposite polarity "turn-off" potential for controlled rectifiers 31, 32, 33, and 34 stored in capacitor 215 is quickly dissipated through the low resistance path introduced by the forward-biased diodes 217 and 218, or 216 or 219, as discussed heretofore, presents no output wave form distortion problem. It should be noted that the diode network comprising diodes 216 to 219 in combination with controlled rectifier 212, saturable inductor 211, and diode 207 enables the circuit to handle loads which are completely reactive. Since frequency converter circuits often "look-in" to loads with reactive components, this inventive feature represents a significant advantage.

In summary, we see that the circuit of FIG. 2 represents improvements in the basic inventive concepts of FIG. 1 in that improved turn-off networks supplied by an auxiliary source are provided for positive precise switching action. Positive switching action in turn results in purity of wave form and exact frequency control.

Since changes may be made in the above-described arrangements and different embodiments may be devised by those skilled in the art without departing from the spirit and scope of the invention, it is to be understood that all matter contained in the foregoing description and accompanying drawings is illustrative of the application of the principles of the invention and is not necessarily to be construed in a limiting sense.

What is claimed is:

1. A frequency converter comprising first and second circuit interrupters, energy storage means, a source of potential, a load, a modulator, means for serially connecting said source of potential, said first circuit interrupter, said energy storage means, said second circuit interrupter, said modulator and said load, whereby energy is transmitted from said source to said energy storage means when said first circuit interrupter is conductive and from said energy storage means to said modulator when said second interrupter is conductive, said first and second interrupters being conductive for at least a portion of alternate intervals, said modulator being conductive for intervals proportional to the desired load frequency.

2. A frequency converter for connection between a power source and a load which comprises a first circuit interrupter connected to block the flow of energy from said source to said load during intermittent intervals, means to store the energy transmitted from said source by said first circuit interrupter, a modulator, a second circuit interrupter connected to block the flow of energy from said energy storage means to said modulator during intermittent intervals, means for rendering said first and second interrupters conductive only during respectively different time intervals and means for controlling the conductivity of said modulator to transmit energy to said load at intervals corresponding to the desired output frequency.

3. A frequency converter comprising first and second circuit interrupters, energy storage means, a source of potential, a load, modulator, switching means, means for serially connecting said source of potential, said first circuit interrupter, said energy storage means, said second circuit interrupter, said modulator, said switching means, and said load, whereby energy is transmitted from said source to said energy storage means when said first circuit interrupter is conducting and from said energy storage means to said modulator when said second circuit interrupter is conducting, said first and second circuit interrupters being conductive for at least a portion of alternate intervals, said modulator and said switching means being conductive for intervals proportional to the desired load frequency.

4. A frequency conversion system in accordance with claim 3 wherein the intervals that said modulator is conducting is controlled by load voltage variations and a source of reference frequency equal to the desired load frequency.

5. A frequency converter comprising first, second, third, and fourth circuit interrupters, energy storage means, a source of input potential, a load, a modulator, means for serially connecting said source of input potential, said first circuit interrupter, said second circuit interrupter, said modulator, said load, said third circuit interrupter, and said fourth circuit interrupter, means for connecting said first energy storage means between said first and second circuit interrupters and said third and fourth circuit interrupters, means connected to said first and fourth circuit interrupters to render said first and fourth circuit interrupters conductive at predetermined intervals coinciding with the termination of conduction through said second and third circuit interrupters to transmit energy from said source of potential to said energy storage means, means connected to said second and third circuit interrupters to render said second and third circuit interrupters conductive at predetermined intervals coinciding with the termination of conductivity through said first and fourth circuit interrupters to transmit energy from said storage means to said modulator, means connected to said modulator to render said modulator conductive for intervals proportional to load voltage and frequency, and sustaining means connected to said second and third circuit interrupters whereby the conductivity of said second and third circuit interrupters is sustained for the entire predetermined interval of conductivity of said second and third circuit interrupters regardless of the conductivity of said modulator.

6. A frequency converter comprising first and second circuit interrupters, energy storage means, a source of input frequency, a load, a modulator, switching means, a source of reference frequency, means for connecting said first circuit interrupter to said source of input frequency, means for connecting said energy storage means between said first and second circuit interrupters, means for connecting said modulator between said second circuit interrupter and said switching means, means for connecting said source of reference frequency to said switching means, and means for connecting said switching means to said load and said source to transmit energy to said load in opposite directions at intervals determined by said source of reference frequency.

7. In a frequency converter in accordance with claim 6, means responsive to load voltage variations, and means for connecting said load voltage responsive means and said source of reference frequency to said modulator whereby said modulator is controlled in accordance with both load voltage variations and said reference frequency.

8. A frequency converter having first, second, third, and fourth bistable devices each having high and low states of conduction, first and second energy storage means, a modulator, switching means, a source of reference frequency, a source of input frequency, means for connecting said first bistable devices between said source of input frequency and said second bistable device, means for connecting said modulator between said second bistable device and said first energy storage means, means for connecting said first energy storage means to said switching means, means for connecting said source of reference frequency to said switching means and said modulator, means for connecting said switching means to said load and said third bistable device to transmit current from said first storage means to said load in opposite directions at intervals determined by said reference frequency, means for connecting said fourth bistable device between said source of input frequency and said third bistable device, means for connecting said second energy storage means between said first bistable device and said fourth bistable device, means connected to said first and fourth and second and third bistable devices to render said first and fourth and second and third bistable devices conductive for alternate intervals, respectively, and means for connecting load voltage responsive means to said modulator whereby the input frequency which has been transmitted from said input source by said first and fourth bistable devices to said second energy storage means and then from said second energy storage means to said modulator by said second and third bistable devices is modulated in accordance with load voltage and reference frequency variations and transmitted to said first energy storage means to be filtered and transmitted to said load.

9. A frequency converter in accordance with claim 8 wherein said switching means comprises fifth, sixth, seventh, and eighth, bistable devices connected in a bridge circuit having four legs forming a pair of input and a pair of output vertices, an individual one of each of said fifth, sixth, seventh, and eighth bistable devices being connected in each leg of said bridge, detecting means, means for connecting said detecting means across said fifth and sixth bistable devices whereby the high state of conduction of said seventh and eighth bistable devices is initiated upon the removal of potential across said fifth and sixth bistable devices.

10. A frequency converter comprising first and second circuit interrupters, first and second energy storage means, a source of pulsating potential, a load, a modulator, means for serially connecting said source of potential, said first circuit interrupter, said first energy storage means, said second circuit interrupter, said second energy storage means, and said load, whereby pulsating energy is transmitted from said source to said first energy storage means when said first circuit interrupter is conductive and from said first energy storage means to said second energy storage means when said second circuit interrupter is conductive, said first and second circuit interrupters being conductive for at least a portion of alternate intervals, said modulator being conductive for intervals proportional to the desired load frequency unhindered by the frequency of said pulsating source.

11. A frequency converter for connection between a source of input frequency and a load which comprises a first circuit interrupter connected to block the flow of energy from said source to said load during intermittent intervals, first energy storage means to store the energy transmitted from said source by said first circuit interrupter, a modulator, a second circuit interrupter connected to block the flow of energy from said energy storage means to said modulator during intermittent intervals, means for rendering said first and second circuit interrupters conductive only during respectively different time intervals, means for controlling the conductivity of said modulator to transmit energy to a second energy storage means and means for transmitting the energy from said second energy storage means to said load in accordance with the desired load frequency.

12. A frequency converter comprising first and second circuit interrupters, first and second energy storage means, a source of potential, a load, a modulator, a source of reference frequency, switching means, means for connecting said first circuit interrupter to said source of potential, means for connecting said first energy storage means between said first and second circuit interrupters, means for connecting said second energy storage means between said second circuit interrupter and said modulator, means for connecting said modulator to said switching means, means for connecting said source of reference frequency to said switching means, and means for connecting said switching means to said load and said source to transmit energy that is delivered from said source to said first energy storage means through said first circuit interrupter and from said first energy storage source to said first energy storage means through said second circuit interrupter and from said second energy storage means through said modulator to said switching means to said load in opposite directions at intervals determined by said reference frequency.

13. In a frequency converter in accordance with claim 12, means responsive to load voltage variations, and means for connecting said load voltage responsive means and said source of reference frequency to said modulator whereby said modulator is controlled in accordance with load voltage variations and said reference frequency.

14. In a frequency converter in accordance with claim 12, third, fourth and fifth energy storage control means, individual means for charging said third, fourth and fifth energy storage means to a potential sufficient to change the state of conduction of said first and second circuit interrupters and said modulator during their respective nonconduction intervals, and means for individually connecting each of said third, fourth and fifth energy storage means across said first and second circuit interrupters and said modulator respectively at predetermined intervals to terminate the production therethrough.

15. In a frequency converter in accordance with claim 12, asymmetrically conducting means, and means for connecting said asymmetrically conducting means across said switching means whereby said switching means switches unhindered by phase shifts due to reactive loads.

16. In a frequency converter in accordance with claim 12, third energy storage means, means for connecting said third energy storage means across said switching means, and means for charging said third energy storage means such that said switching means changes the direction in which energy is applied to said load.

17. In a frequency converter in accordance with claim 16, means connected across said third energy storage means to quickly discharge said third energy storage means.

18. A frequency converter comprising first, second, third, and fourth bistable devices each having a high and low state of conduction, first, second, and third energy storage means, a modulator, switching means, a source of input potential, a source of reference frequency, means for connecting said first bistable device to said source of input potential, means for connecting said first energy storage means between said first and second bistable devices, and said third and fourth bistable devices, means for connecting said third and fourth bistable devices, means for connecting said second energy storage means from said second bistable device and said modulator to said third bistable device, means for connecting said third energy storage means between said modulator and said third bistable device, means for connecting said source of reference frequency to said modulator and said switching means, means for connecting said switching means to said modulator and said third bistable device such that energy is transmitted to said load in opposite polarity directions for alternate intervals determined by said reference frequency source.

19. A frequency converter in accordance with claim 18 wherein said modulator is a fifth bistable device having a high and low state of conduction, means responsive to load voltage variations, and means for connecting said load voltage responsive means to said fifth bistable device whereby the load frequency is a function of said reference frequency source and said load voltage variations.

20. A frequency converter in accordance with claim 18 wherein said switching means comprises fifth, sixth, seventh, and eighth bistable devices forming a bridge circuit having four legs forming a pair of input and a pair of output vertices, an individual one of each of said fifth, sixth, seventh, and eighth bistable devices in each leg of said bridge, means for connecting said input vertices from said third energy storage means to said third bistable device, means for connecting said output vertices to said load, first, second, third, and fourth asymmetrically conducting devices, means for connecting an individual one of each of said first, second, third, and fourth asymmetrically conducting devices across each of said fifth, sixth, seventh, and eighth bistable devices, detecting means, means for connecting said detecting means across said fifth and sixth bistable devices whereby the high state of conductivity of said seventh and eighth bistable devices is initiated unhindered by phase variations due to reactive loads.

21. In a frequency converter in accordance with claim 20, means for terminating the high state of conduction of said fifth, sixth, seventh, and eighth bistable devices, control means comprising a ninth bistable device and a second source of potential serially connected across said input vertices and means for initiating the high state of conduction in said ninth bistable devices when the voltage across said fifth bistable devices falls to a negligible value whereby said third energy storage means is charged to a potential such that the low state of conduction is initiated in said fifth bistable device.

22. In a frequency converter in accordance with claim 21, a tenth bistable device, time delay means, means for serially connecting said time delay means and said tenth bistable device across said third energy storage means, and means for initiating the high state of conduction in said tenth bistable device whereby the energy stored in said third energy storage means to initiate the low state of conduction in said fifth bistable device is quickly dissipated.

23. A converter circuit comprising a source of input potential, switching means, a source of reference frequency, a load, and phase determining means for controlling the direction of current flow through said load, means for serially connecting said source of input potential, said switching means, said phase determining means, and said load, means to control said switching means so that said switching means intermittently transmits energy from said source of input potential to said phase determining means at intervals proportional to the frequency of said reference frequency source, and means including said reference frequency source to control said phase determining means so that current flows through said load in one direction during one of said intervals and in an opposite direction during the succeeding interval, said reference frequency being proportional to the desired frequency of the current flowing through said load.

References Cited by the Examiner

UNITED STATES PATENTS

| | | | |
|---|---|---|---|
| 2,749,499 | 6/1956 | Hosticks et al. | 321—4 |
| 3,096,472 | 7/1963 | Elliott et al. | 321—45 |
| 3,109,976 | 11/1963 | Sichling | 321—4 |
| 3,119,058 | 1/1964 | Genuit | 321—45 |

MILTON O. HIRSHFIELD, *Primary Examiner.*

LLOYD McCOLLUM, *Examiner.*